Dec. 23, 1941. M. BENITO Y DE LA ROSA 2,267,084
RESILIENT WHEEL FOR VEHICLES
Filed July 20, 1940 2 Sheets-Sheet 1
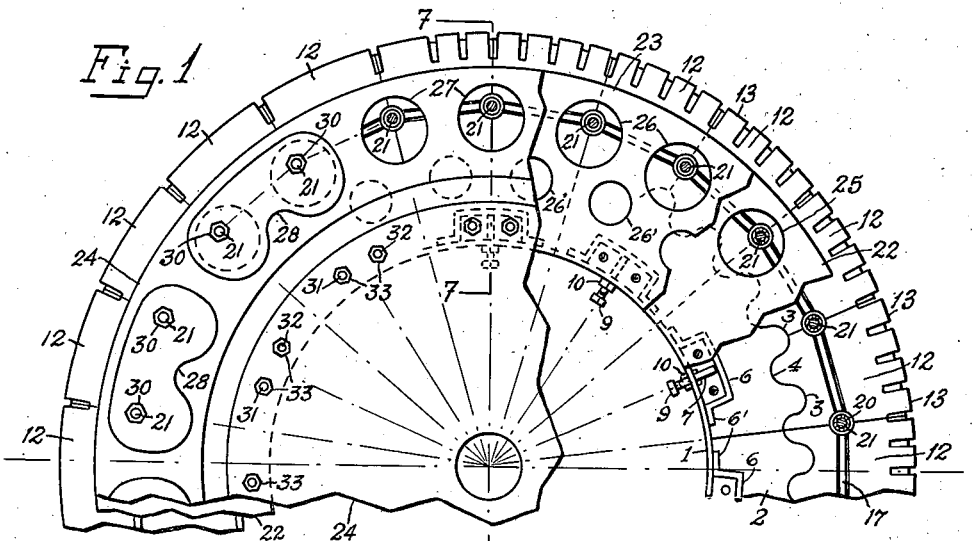
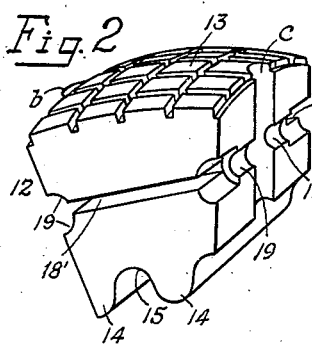
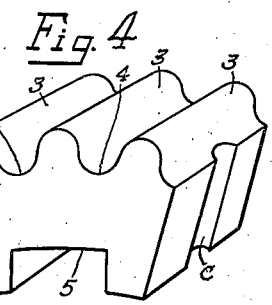
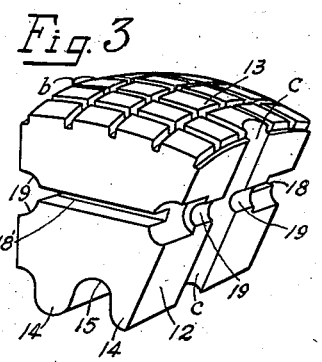
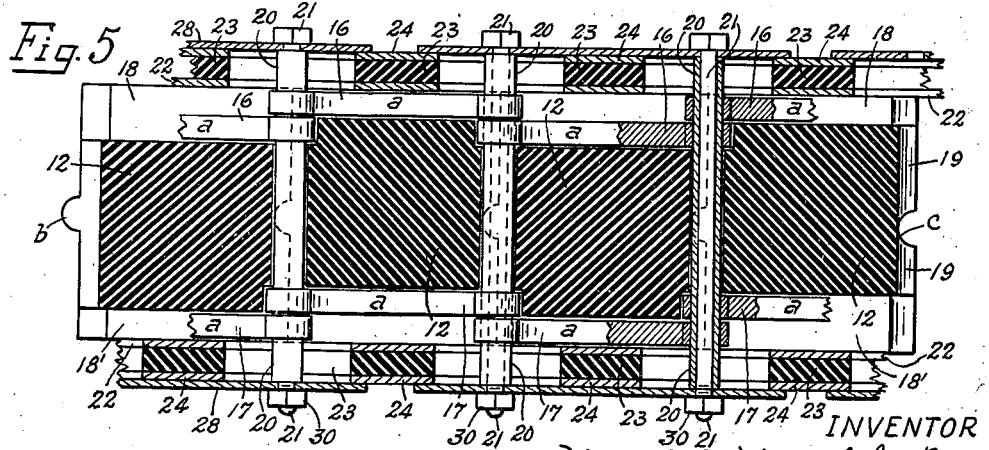

Dec. 23, 1941.   M. BENITO Y DE LA ROSA   2,267,084
RESILIENT WHEEL FOR VEHICLES
Filed July 20, 1940   2 Sheets-Sheet 2
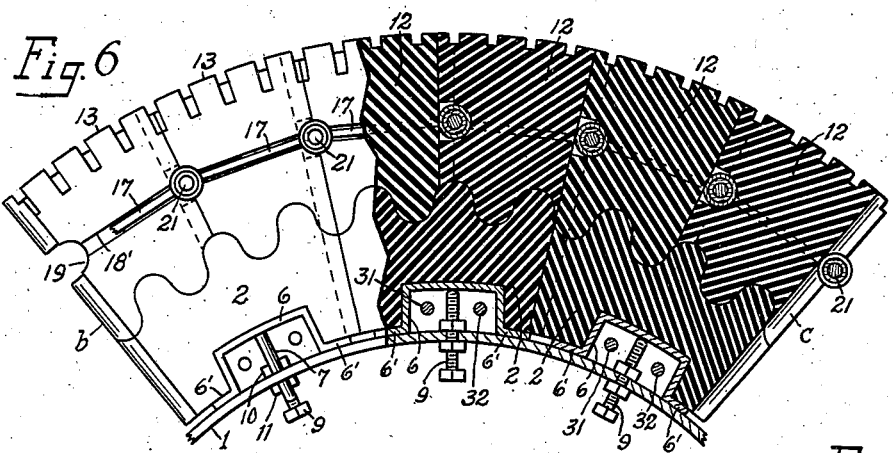
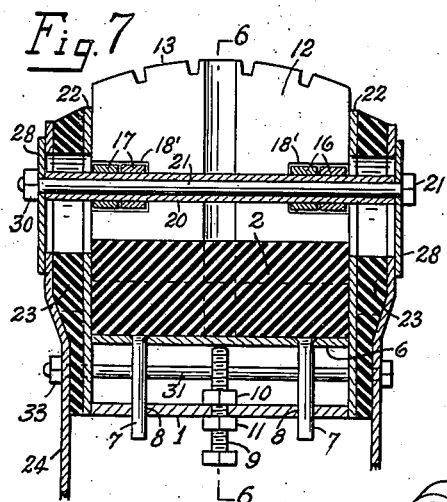
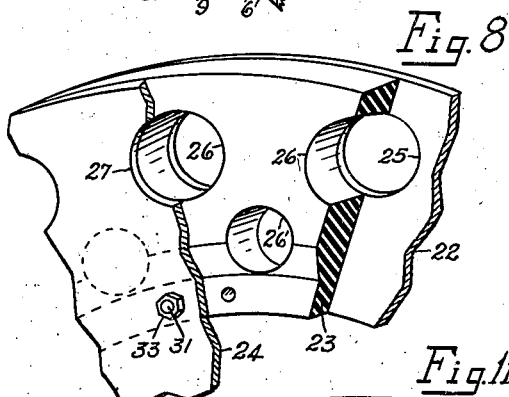
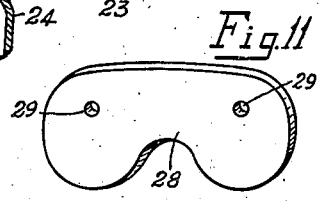
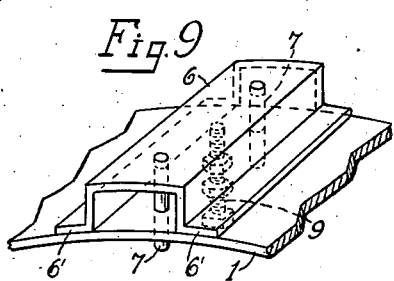
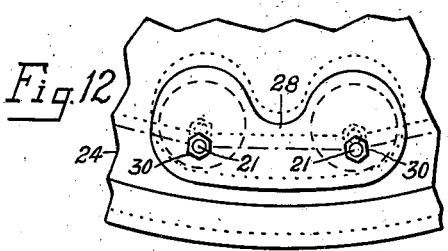

Patented Dec. 23, 1941

2,267,084

UNITED STATES PATENT OFFICE 2,267,084

RESILIENT WHEEL FOR VEHICLES

Manuel Benito y de la Rosa, Habana, Cuba

Application July 20, 1940, Serial No. 346,636
In Cuba July 22, 1939

4 Claims. (Cl. 152—7)

This invention relates to certain new and useful improvements in resilient wheels for vehicles, particularly for heavy vehicles, such as busses, trucks and the like.

The main object of this invention is to provide a wheel composed of an inner member formed by an inner rim on which are circumferentially disposed a series of cushion blocks, an outer member consisting of a solid tire formed by a series of cushion blocks pivotally tied together by a double linkbelt embedded in recesses laterally formed in the cushion blocks and pivotally connected to one another by transversal pins mounted in complementing notches formed in the end radial faces of the cushion blocks, and side lock disks covering the cushion blocks of the inner and outer members, said disks also being resilient. By means of this combination the portions of the wheel are allowed to move radially as well as transversally in relation to one another, the wheel thus affording its greater coefficient of safety and permitting strikes against any of the parts thereof to be absorbed and deadened at a reduced section of the wheel, whereby the strike effect will not be transmitted to the remainder of the wheel periphery at the same time that punches and bursts are eliminated, a bullet-proof wheel being thus provided.

Another object of the invention is to provide means mounted on the inner rim and concealed within each cushion block of the inner member to raise the cushion blocks upon their seats and compensate the outer wearing effect of the cushion blocks of the tread tire.

The invention is described with reference to the figures of the accompanying drawings, of which:

Figure 1 is an outer elevational view of a wheel, with several portions broken away to more clearly illustrate the inner structure of the wheel.

Figures 2 and 3 are perspective views of a pair of cushion blocks of the tread tire, which are mounted on a common bearing cushion block on the inner rim.

Figure 4 is a perspective view of the bearing cushion block on which the two cushion blocks represented in Figs. 2 and 3 are supported.

Figure 5 is a section view on a portion of the circle line of the double linkbelt joining the tire cushion blocks, developed on a horizontal plane.

Figure 6 is in part a side view and in part a longitudinal vertical section view of the wheel on line 6—6 of Fig. 7.

Figure 7 is a radial vertical section view of the wheel on line 7—7 of Fig. 1.

Figure 8 is a partial perspective view of a cushion disk and two flexible metallic disks between which the cushion disk is secured, all of which form one of the side lock members for the wheel.

Figure 9 is a perspective view of a metallic shell transversally lodged beneath each bearing cushion block with the means for outwardly raising the cushion blocks with relation to the rim.

Figure 10 is a perspective view of one of the links of the double linkbelt pivotally tying together the cushion blocks of the wheel tire.

Figure 11 is a plan view of one of the close plates covering the transversal holes of the wheel.

Figure 12 is an elevational section view of the wheel provided with one of the close plates shown in Fig. 11, to show the possible extent of the radial movement between the cushion blocks forming the wheel periphery and the side lock members of the wheel.

In the drawings in which the same reference letters and numbers indicate similar parts in all figures, 1 illustrates the rim of the wheel inner member. This member comprises also an annular series of cushion blocks 2, made of rubber, pressed leather or a like resilient material (Fig. 4), and all said cushion blocks have vertical side faces and radial end faces, their top surface having alternate teeth 3 and notches 4 of round outline and disposed transversally, and in the bottom surface of each block 2 is formed a recess 5 in the shape of a transversal channel which is adapted to fit on a metallic shell 6 opened interiorly and having side flanges 6' bearing on the inner rim 1, two vertical pins 7 projecting downwardly from the top of the metallic shell 6 and passing through holes 8 formed in the rim 1, and on a tread hole formed in the rim 1 between the two holes 8 is rotatably mounted a screw 9 screwed from below to above until its end contacts the top portion of the shell 6, said screw being held in place by two opposed nuts 10 and 11 screwed on the screw 9 on opposed sides of the rim 1.

The outer member of the wheel comprises a solid tire formed by an annular series of cushion blocks 12 preferably made of rubber (Figs. 2 and 3) and each having vertical side faces, radial end faces, a tread top surface 13, and a bottom surface having a series of teeth 14 and intermediate notches 15 of rounded outline and transversally disposed, which are adapted to mesh with the upper notches 4 and teeth 3 of the cushion blocks 2 of the inner member. Each pair of cushion blocks 12 of the outer member bear on a cushion block 2 of the inner member. The cushion blocks 12 of the outer member are pivotally tied together by two metallic linkbelts 16 and 17 the links a (Fig. 10) of which have a plane body and one eye at each end of its body and the two adjacent links of each linkbelt are laterally disposed as shown in Figs. 5 and 7. The links a of the linkbelts 16 and 17 are embedded in recesses laterally formed in the cushion blocks 12 so that there is a plane recess 18 of the width of the body of one link at one side and a plane recess 18' of the width of two link bodies at the opposite side of a same cushion block 12, the eyes of the links being lodged in circle complementing notches 19 formed on the adjacent end faces of two cushion blocks 12. In the transversally aligned eyes of the links of the linkbelts 16 and 17 are received the setting apart tubes 20 across which pass the head pivot pins 21 connecting the links a. Each two adjacent cushion blocks 2 and each two adjacent cushion blocks 12 have between them a pivotal connection by means of a half-round rib b on the end face of a cushion block, which rib engages a gauge c recessed in the adjacent end face of the next cushion block.

The cushion blocks 2 and 12 of the inner and outer members of the wheel are held in circular alignment by means of a lock member at each side of the wheel, each lock member consisting of a thin annular metallic disk 22 adjacent the outer side faces of the cushion blocks 2 and 12, a thick annular cushion disk 23 tapered to its middle portion and adjacent the metallic disk 22 and another thin circular metallic disk 24 tapered to the wheel centre and positioned close to the outer face of the cushion disk 23. The two metallic disks 22 and 24 and the intermediate cushion disk 23 have a series of annular holes 25, 26 and 27 in transversal alignment whose function is to permit a radial movement between the cushion blocks 2 and 12 and the side lock members, the end portions of the setting apart tubes 20 and the pins 21 forming the linkbelts 16 and 17 remaining widely lodged across said holes 25, 26 and 27. The cushion disks 23 have another series of holes 26' to lighten their weight. Each two consecutive series of holes of the disks are covered exteriorly by cover plates 28 (Fig. 11) which are held by the projecting ends of the pins 21 passing through holes 29 in plates 28. The heads of the pins 21 tighten against the outer faces of the plates 28 at one side of the wheel and on the threaded end portions of the pins 21 at the other side of the wheel are threaded nuts 30 against the outer faces of the respective plates 28.

Moreover, the connection between the side lock members and the inner and outer members of the wheel is secured by means of a pair of head pins 31 and 32 passing longitudinally across the inner space in each metallic shell 6 and through holes formed in the disks 22, 23 and 24 at both sides of the wheel near the inner rim 1, the threaded projecting ends of the pins 31 and 32 being tightened by nuts 33 against the outer metallic disk 24 at the other side of the wheel.

In the operation of the wheel, any violent strike against a cushion block 12 of the wheel tire, as caused by a deep hole in the road or a collision against a sidewalk, will be limited and will be absorbed by the cushion block 12 receiving it directly and by the cushion block 2 on which it bears, which by the effect of the described structure will be permitted to move radially along with the linkbelts 16 and 17 and the cover plates 28 with relation to the side lock members as shown by the dotted lines in Fig. 12 of the drawings, the connections betwen the adjacent links of the linkbelts and the transversal pivot shafts formed by the teeth of the outer cushion blocks 12 meshing with the inner cushion blocks 2, permitting a rotatory movement between adjacent portions of the wheel periphery without that the strike effect be transmitted to the remainder of the wheel periphery. Also, the engaging radial rib b and gauge c of adjacent cushion blocks will allow a pivotal motion on a radial shaft between two adjacent blocks of each member of the wheel.

Likewise, any side strike against the wheel will be deadened by the transversal flexibility of the wheel periphery due to the resilient nature of the disks forming the lock members at each side of the wheel, whereupon this new wheel is even bullet-proof.

In order to compensate any wearing of the tire cushion blocks 12, it will be sufficient to rotate the screw 9 to cause it to slide upwards within the shell 6 and raise the top portion of the shell 6 with the cushion blocks 2 and 12 mounted thereon.

What I claim is:

1. A wheel comprising an inner member having a rim, separate bearing cushion blocks carried by the rim, an outer member having separate cushion blocks shiftably supported on the cushion blocks of the inner member and linkbelts embedded in the separate cushion blocks of the outer member to pivotally tying them together, annular lock members placed at both sides of the wheel and means securing the side lock members across the separate cushion blocks of the inner and outer members.

2. A wheel comprising an inner member having a rim, separate bearing cushion blocks carried by the rim, an outer member having separate cushion blocks having an outer tread surface and shiftably supported on the cushion blocks of the inner member and linkbelts embedded in the separate cushion blocks of the outer member to pivotally tying them together, annular lock members placed at both sides of the wheel and each having a cushion disk, and means securing the side lock members across the points between the separate cushion blocks of the outer member.

3. A wheel comprising an inner member having a rim, separate bearing cushion blocks carried by the rim, and each having an indented top surface, an outer member having separate cushion blocks having a tread top surface and an indented bottom surface adapted to engage the indented top surface of the cushion blocks of the inner member on which the outer blocks are supported, linkbelts embedded in the separate cushion blocks of the outer member to pivotally tying them together, annular lock members placed at both sides of the wheel and each having a cushion disk between two metallic disks, and means securing the side lock members across the separate cushion blocks of the inner and outer members.

4. A wheel comprising an inner member having a rim, separate bearing cushion blocks carried by the rim and each having an indented top surface, an outer member having separate cushion blocks each having a tread top surface and an indented bottom surface adapted to shiftably engaging the indented top surface of the cushion blocks of the inner member on which the outer cushion blocks are supported, linkbelts the links of which are embedded in recesses laterally formed in the separate cushion blocks of the outer member and the pins of which are lodged in circle complementing notches on end faces of adjacent cushion blocks of the outer member to pivotally tying them together, annular lock members placed at both sides of the wheel and each having a cushion disk between two metallic disks one of which is adjacent the vertical side face of the two series of cushion blocks, and means securing the side lock members across the separate cushion blocks of the inner and outer members.

MANUEL BENITO Y DE LA ROSA.